(12) United States Patent
Talty et al.

(10) Patent No.: US 9,667,286 B1
(45) Date of Patent: May 30, 2017

(54) RECEIVER ADJACENT CHANNEL OVERLOAD PROJECTION

(71) Applicant: GM GLOBAL TECHNOLOGY OPERATIONS LLC, Detroit, MI (US)

(72) Inventors: Timothy J. Talty, Beverly Hills, MI (US); Duane S. Carper, Davison, MI (US); Alan T. Budyta, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/347,971

(22) Filed: Nov. 10, 2016

(51) Int. Cl.
*H04H 20/74* (2008.01)
*H04B 1/10* (2006.01)
*H04H 40/90* (2008.01)

(52) U.S. Cl.
CPC ........... *H04B 1/1027* (2013.01); *H04B 1/109* (2013.01); *H04H 40/90* (2013.01); *H04B 2001/1045* (2013.01); *H04B 2001/1063* (2013.01)

(58) Field of Classification Search
CPC ................ H04B 1/1027; H04B 1/109; H04B 2001/1045; H04B 2001/1063; H04H 40/90
USPC ......... 455/3.02, 115.3, 129, 134, 135, 161.3, 455/226.2, 226.3, 280, 289, 319, 338
See application file for complete search history.

(56) References Cited

U.S. PATENT DOCUMENTS

| | | | | |
|---|---|---|---|---|
| 4,462,009 A | * | 7/1984 | Landt | H03J 7/02 333/17.1 |
| 5,444,737 A | * | 8/1995 | Cripps | H03C 3/0975 375/219 |
| 5,477,226 A | * | 12/1995 | Hager | G01S 13/34 342/120 |
| 2004/0169551 A1 | * | 9/2004 | Palaskas | H03G 1/04 327/552 |
| 2007/0008132 A1 | * | 1/2007 | Bellantoni | H01P 5/04 340/572.1 |
| 2008/0026718 A1 | * | 1/2008 | Wangard | H04B 1/1027 455/266 |
| 2010/0093282 A1 | * | 4/2010 | Martikkala | H04B 17/364 455/63.4 |
| 2012/0013418 A1 | * | 1/2012 | Park | H04B 1/18 333/109 |
| 2012/0050102 A1 | * | 3/2012 | Hammes | G01S 19/24 342/357.49 |
| 2013/0214727 A1 | * | 8/2013 | Teng | H02J 7/0052 320/107 |
| 2013/0217343 A1 | * | 8/2013 | Tenbroek | H04W 24/00 455/77 |
| 2013/0316657 A1 | * | 11/2013 | Chen | H04B 17/0057 455/67.13 |

(Continued)

*Primary Examiner* — Dominic Rego

(57) ABSTRACT

A filter system that filters WCS signals received by a satellite radio antenna if the WCS signals have a high enough signal strength where they could overwhelm the satellite radio signals and prevent the satellite radio from operating. The filter system includes a coupling circuit that couples off a small portion of the signal received by the antenna and sends it to a detector that detects the signal strength of the coupled off portion of the signal. If the signal strength exceeds a predetermined threshold, the detector provides a control signal to a switch that directs the signal received by the antenna to a WCS filter to filter out the WCS signals, where the switch otherwise causes the signal received by the antenna to be sent directly to the radio.

20 Claims, 2 Drawing Sheets

(56) References Cited

U.S. PATENT DOCUMENTS

2015/0200736 A1* 7/2015 Chen .................. H04W 88/06
455/552.1

* cited by examiner

RECEIVER ADJACENT CHANNEL OVERLOAD PROJECTION

BACKGROUND OF THE INVENTION

Field of the Invention

This invention relates generally to a system and method for filtering signals in a frequency band adjacent to a frequency band being employed for radio reception and, more particularly, to a system and method for filtering wireless communications service (WCS) signals broadcast in a frequency band that is adjacent to a satellite radio frequency band being received by a vehicle satellite radio.

Discussion of the Related Art

Mobile wireless cellular devices are everywhere. Cellular devices allow for the wireless transmission and reception of video, audio and data, and are relied on by users for many purposes. Those purposes and the technology, such as 4G long term evolution (LTE), to provide the services are increasing, which requires an increasing need for more wireless bandwidth and data throughput. With the explosion in demand for cellular data and voice services, there is an increasing burden on the existing frequency bands allocated for these services, where the available cellular bandwidth is becoming insufficient to meet those demands. Providing additional frequency bands for cellular services has a direct and often times measurable impact on commercial progress.

The Federal Communications Commission (FCC) regulates which frequency bands are used for what purposes in the United States. Thus, there has been significant pressure on the FCC to allocate more frequency bands for cellular services, which also provides significant revenue. In response, the FCC has recently reallocated the WCS frequency band for cellular services, where the 2305-2320 MHz frequency band is now being used for signals transmitted from mobile cellular devices to a cellular tower and the 2345-2360 MHz frequency band is now being used for signals transmitted from the cellular tower to the mobile devices.

Satellite radio, specifically Sirius and XM, have also been allocated a certain frequency band by the FCC, where Sirius satellite radio operates in the 2320-2332.50 MHz frequency band and XM satellite radio operates in the 2332.50-2345 MHz frequency band. As is apparent, the XM frequency band is contiguous and adjacent to the WCS frequency band used for signals transmitted by the cellular tower and the Sirius frequency band is contiguous and adjacent to the WCS frequency band used for signals transmitted by the mobile devices.

Satellite radios receive signals from satellites from which certain audio can be played. Those signals are at relatively low power when received by the radio. Cellular towers broadcast cellular signals to the mobile wireless devices within a certain range of the tower. Those signals are broadcast at a relatively high power from the tower to be received by the mobile devices some distance away at the appropriate data rate throughput. If a vehicle having a satellite radio is travelling within a certain proximity to a cellular tower that is broadcasting cellular signals in the WCS frequency band, those signals are received by the satellite radio antenna on the vehicle at a relatively high power, for example, possibly five magnitudes larger than the satellite radio signals being received by the antenna. For XM satellite radio signals that may be directly adjacent to the WCS signals from the cellular tower, the WCS frequency signals can overwhelm and block the satellite radio signals, where the satellite radio on the vehicle may go mute.

Also, if a vehicle having a satellite radio is travelling within a certain proximity of a mobile cellular device that is transmitting cellular signals in the WCS frequency band, where the cellular device may be in the vehicle, those signals are received by the satellite radio antenna on the vehicle and possibly at a higher power level than the satellite radio signals. For Sirius satellite radio signals that may be directly adjacent to the WCS signals from the cellular device, the WCS frequency signals can overwhelm and block the satellite radio signals, where the satellite radio on the vehicle may go mute.

SUMMARY OF THE INVENTION

The present invention discloses and describes a filter system that filters WCS signals received by a satellite radio antenna if the WCS signals have a high enough signal strength where they could overwhelm the satellite radio signals and prevent the satellite radio from operating. The filter system includes a coupling circuit that couples off a small portion of the signal received by the antenna and sends it to a detector that detects the signal strength of the coupled off portion of the signal. If the signal strength exceeds a predetermined threshold, the detector provides a control signal to a switch that directs the signal received by the antenna to a WCS filter to filter out the WCS signals, where the switch otherwise causes the signal received by the antenna to be sent directly to the radio.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a WCS filter system for filtering WCS signals in a satellite radio is merely exemplary in nature, and is in no way intended to limit the invention or its applications or uses. For example, as discussed herein, the satellite radio is on a vehicle. However, as will be appreciated by those skilled in the art, the satellite radio may be on other mobile platforms or otherwise.

Figure 1:
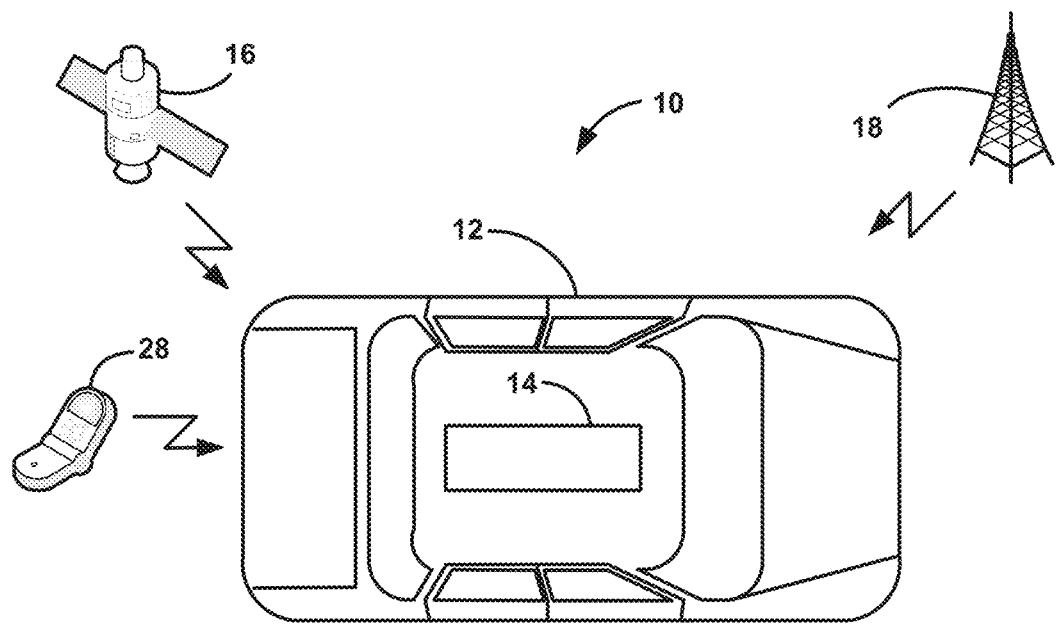
FIG. 1 is an illustration of a vehicle having a satellite radio in communication with a satellite and a cellular tower.

FIG. 1 is an illustration 10 showing a vehicle 12 having a satellite radio 14, such as an XM satellite radio or a Sirius satellite radio, that receives satellite radio signals from a satellite 16. The vehicle 12 may be traveling near a cellular tower 18 that may be broadcasting cellular signals in the WCS frequency band that may be adjacent to the frequency band of the signals broadcast by the satellite 16. For example, the radio 14 may be an XM radio, the satellite 16 may be broadcasting XM signals in the 2332.50-2345 MHz frequency band, and the cellular tower 18 may be broadcasting WCS signals in the 2345-2360 MHz frequency band. As discussed above, the power of the signals from the cellular tower 18 may be high enough and close enough in frequency to the signals transmitted by the satellite 16 that the satellite radio signals are overwhelmed in the radio 14 and it goes mute. The vehicle 12 may also be traveling near a mobile cellular device 28 that may be transmitting cellular signals in the WCS frequency band that also may be adjacent to the frequency band of the signals broadcast by the satellite 16, where the device 28 may be inside the vehicle 12. For example, the radio 14 may be a Sirius radio, the satellite 16 may be broadcasting Sirius signals in the 2320-2332.50 MHz frequency band, and the cellular device 28 may be transmitting WCS signals in the 2305-2320 MHz frequency band. As discussed above, the power of the signals from the cellular device 28 may be high enough and close enough in frequency to the signals transmitted by the satellite 16 that the satellite radio signals are overwhelmed in the radio 14 and it goes mute.

Figure 2:
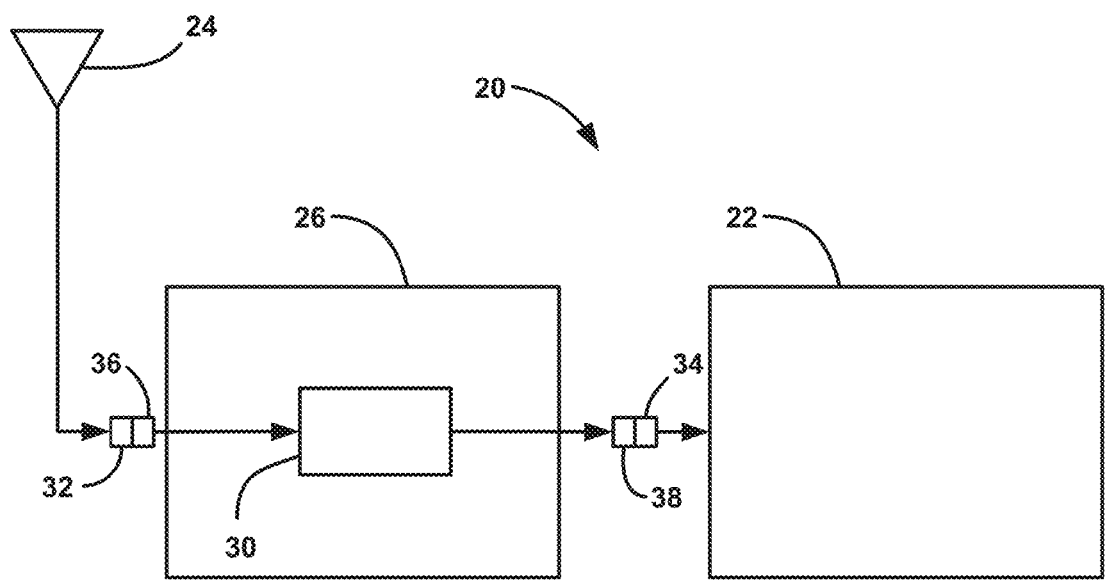
FIG. 2 is a block diagram of satellite radio including a WCS filter system.

FIG. 2 is a block diagram of a satellite radio system 20 that includes a satellite radio 22 that receives satellite radio signals from, for example, the satellite 16 by an antenna 24. As is known in the art, satellite radio antennas, as well as other antennas on a vehicle, are coupled to the particular receiver/transmitter by coaxial cables, where those cables may be coupled together in sections by in-line connectors, such as FAKRA connectors, so that the vehicle can be manufactured in parts, and then assembled together by connecting the connectors. The present invention proposes inserting a WCS filter system 26 between the antenna 24 and the radio 22, where the system 26 includes, for example, a low-pass WCS filter 30 that filters out signals from the tower 18 received by the antenna 24 before they are able to be received by the radio 22. In other embodiment, the filter may be a band-pass, notch or high-pass filter consistent with the discussion herein.

In this design, an in-line coaxial connector 32 that may have previously been coupled to an in-line coaxial connector 34 to connect the antenna 24 to the radio 22 may be disconnected, and the filter system 26 is connected between the antenna 24 and the radio 22 by connecting a coaxial connector 36 to the connector 32 and a coaxial connector 38 to the connector 34 as shown, where the filter system 26 may be mounted to any suitable location on the vehicle 12. The WCS filter 30 is designed to block or reject signals above the XM frequency band so as to prevent the cellular signals transmitted by the tower 18 from being received by the radio 22. In an alternate embodiment, the filter 30 may be a high-pass filter that is designed to block WCS signals in the 2305-2320 MHz frequency band so that they do not interfere with satellite radio signals for a Sirius satellite radio. The filter 30 can be any suitable low-pass, high-pass, band-pass, notch filter for the applications discussed herein, such as filter commercially available from Quorvo™ having part number QPQ1900Q. It is noted that because the XM or Sirius frequency band and the WCS frequency band being discussed herein are adjacent, the filter 30 needs to have a narrow transition frequency band to pass the desired signals and reject the undesired signals. The WCS filter 30 may be implemented on a printed circuit board wherein the filter response one of a lowpass filter, a highpass filter, a notch filter, or a bandpass filter. By using a notch filter configuration centered at the WCS frequency may provide adequate attenuation for acceptable attenuation. The filter may be implemented using Film Bulk Acoustic Resonator (FBAR) filter technology or a Surface Acoustic Wave (SAW) filter.

In the system 20, the WCS filter 30 attenuates the satellite radio signals to some degree depending on how close there are in frequency to the WCS frequency band. Therefore, if the satellite radio signal is relatively weak, which may be caused by tree foliage, building, etc., the performance of the radio 22 may be reduced even in the absence of signals from the cellular tower 18 or the cellular device 28. In other words, in order for the filter 30 to be acceptable for rejecting the WCS signals, some of the satellite radio signals may be attenuated because of their frequency proximity to the WCS frequency band. Therefore, the present invention proposes to only switch in the WCS filter 30 in the presence of the WCS signals from the cellular tower 18.

Figure 3:
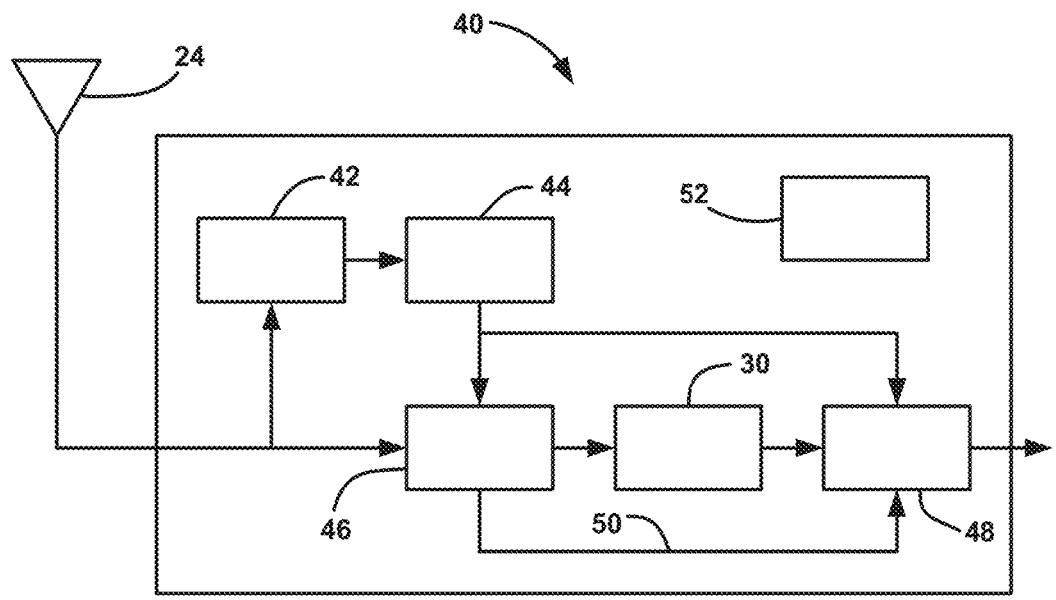
FIG. 3 is a block diagram of a WCS filter system for a satellite radio that includes a WCS signal detector.

FIG. 3 is a block diagram of a WCS filter system 40 that can replace the filter system 26, where the connectors 32, 34, 36 and 38 and the radio 22 are not shown. In this design, a small portion of the signal received by the antenna 24 is coupled off by a coupling circuit 42 and is sent to a detector 44. The detector 44 detects the signal strength of the coupled off portion of the receive signal, and if it is greater than some predetermined threshold, indicating the presence of the WCS signal, the detector 44 sends a control signal that controls a switch 46 to direct the main part of the receive signal to the WCS filter 30. The control signal from the detector 44 also causes a switch 48 to direct the signal output from the WCS filter 30 to the radio 22. If the detector 44 does not detect the high signal power, then the switch 46 remains in the position where the main part of the signal from the antenna 24 is directed to line 50 to by-pass the WCS filter 30, where the switch 48 is in the position to direct that signal to the radio 22. Thus, the WCS signals are prevented from muting the radio 22.

Some of the elements in the system 40 may be active elements, which require a power source beyond the power that may be available to provide power to the antenna 24. For example, the detector 44, the switches 46 and 48, and possibly elements in the filter 30 may have active elements requiring power. Further, active elements may also be employed to amplify the satellite radio signal. To this end, the system 40 may include its own power supply 52, such as a rechargeable battery, or may have an external connection to a power source (not shown).

Figure 4:
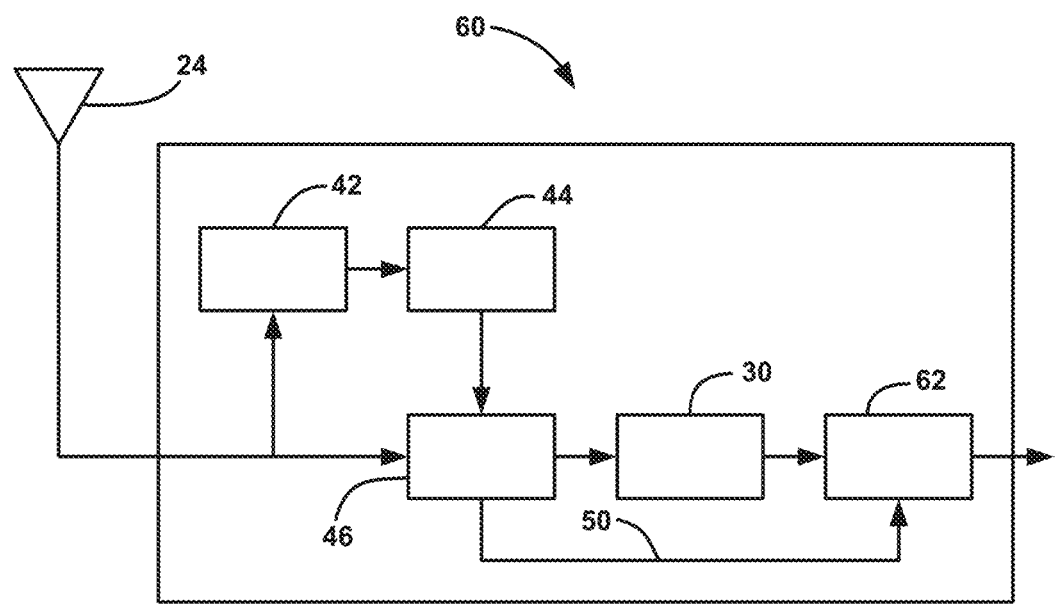
FIG. 4 is a block a diagram of another WCS filter system for a satellite radio that includes a WCS signal detector.

In an alternate embodiment, shown in FIG. 4 as WCS filter system 60, where like elements are identified by the same reference number, the switch 48 can be replaced with an RF combiner 62. In this design, if the main part of the antenna signal is coming through the WCS filter 30, where no signal would be present on the line 50, then the combiner 62 combines that signal with the no signal on the line 50 to provide the output to the radio 22. Likewise, if the switch 46 switches the main part of the antenna signal onto the line 50, where no signal is going through the WCS filter 30, then the combiner 62 outputs the unfiltered signal.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A filter system for filtering wireless communications service (WCS) signals received by a satellite radio, said radio including an antenna receiving satellite radio signals and the WCS signals, said filter system comprising:
   a coupler coupling off a portion of the signals received by the antenna;

a detector for detecting a signal strength of the coupled off portion of the signals received by the antenna and providing a control signal if the signal strength exceeds a predetermined threshold;

a first switch receiving a main portion of the signals received by the antenna and being switched by the control signal from the detector; and a WCS filter receiving the main portion of the signals received by the antenna from the first switch if the first switch receives the control signal, said filter filtering out the WCS signals in the main portion of the signals received by the antenna.

2. The filter system according to claim 1 further comprising a second switch being responsive to the filtered signals from the WCS filter, the control signal and the main portion of the signals received by the antenna from the first switch, said second switch being switched to pass the filtered signals from the WCS filter if the second switch receives the control signal or being switched to pass the main portion of the signals received by the antenna to the satellite radio.

3. The filter system according to claim 1 further comprising a combiner being responsive to the filtered signals from the WCS filter and the main portion of the signals received by the antenna from the first switch, said combiner passing the filtered signals from the WCS filter or the main portion of the signals received by the antenna to the satellite radio.

4. The filter system according to claim 1 further comprising a power source for providing power to active elements in the filter system.

5. The filter system according to claim 1 further comprising a first connector being connected to a coaxial cable connected to the antenna and a second connector being connected to a coaxial cable connected to the satellite radio.

6. The filter system according to claim 1 wherein the satellite radio is an XM satellite radio operating in the 2332.50-2345 MHz frequency band and the WCS signals are in the 2345-2360 MHz frequency band.

7. The filter system according to claim 6 wherein the WCS signals are broadcast by a cellular tower.

8. The filter system according to claim 1 wherein the satellite radio is a Sirius satellite radio operating in the 2320-2332.50 MHz frequency band and the WCS signals are in the 2305-2320 frequency band.

9. The filter system according to claim 8 wherein the WCS signals are broadcast by a wireless mobile cellular device.

10. The filter system according to claim 1 wherein the filter system and the satellite radio are on a vehicle.

11. A filter system for filtering wireless communications service (WCS) signals received by a satellite radio on a vehicle, said radio including an antenna receiving satellite radio signals and the WCS signals, said filter system comprising:

a coupler coupling off a portion of the signals received by the antenna;

a detector for detecting a signal strength of the coupled off portion of the signals received by the antenna and providing a control signal if the signal strength exceeds a predetermined threshold;

a first switch receiving a main portion of the signals received by the antenna and being switched by the control signal from the detector;

a WCS filter receiving the main portion of the signals received by the antenna from the first switch if the first switch receives the control signal and filtering out the WCS signals in the main portion of the signals received by the antenna; and a second switch being responsive to the filtered signals from the WCS filter, the control signal and the main portion of the signals received by the antenna from the first switch, said second switch being switched to pass the filtered signals from the WCS filter if the second switch receives the control signal or being switched to pass the main portion of the signals received by the antenna to the satellite radio.

12. The filter system according to claim 11 further comprising a power source for providing power to active elements in the filter system.

13. The filter system according to claim 11 further comprising a first connector being connected to a coaxial cable connected to the antenna and a second connector being connected to a coaxial cable connected to the satellite radio.

14. The filter system according to claim 11 wherein the satellite radio is an XM satellite radio operating in the 2332.50-2345 MHz frequency band and the WCS signals are in the 2345-2360 MHz frequency band, and wherein the WCS signals are broadcast by a cellular tower.

15. The filter system according to claim 11 wherein the satellite radio is a Sirius satellite radio operating in the 2320-2332.50 MHz frequency band and the WCS signals are in the 2305-2320 frequency band, and wherein the WCS signals are broadcast by a wireless mobile cellular device.

16. A filter system for filtering wireless communications service (WCS) signals received by a satellite radio on a vehicle, said radio including an antenna receiving satellite radio signals and the WCS signals, said filter system comprising:

a coupler coupling off a portion of the signals received by the antenna;

a detector for detecting a signal strength of the coupled off portion of the signals received by the antenna and providing a control signal if the signal strength exceeds a predetermined threshold;

a first switch receiving a main portion of the signals received by the antenna and being switched by the control signal from the detector;

a WCS filter receiving the main portion of the signals received by the antenna from the first switch if the first switch receives the control signal and filtering out the WCS signals in the main portion of the signals received by the antenna; and a combiner being responsive to the filtered signals from the WCS filter and the main portion of the signals received by the antenna from the first switch, said combiner passing the filtered signals from the WCS filter or the main portion of the signals received by the antenna to the satellite radio.

17. The filter system according to claim 16 further comprising a power source for providing power to active elements in the filter system.

18. The filter system according to claim 16 further comprising a first connector being connected to a coaxial cable connected to the antenna and a second connector being connected to a coaxial cable connected to the satellite radio.

19. The filter system according to claim 16 wherein the satellite radio is an XM satellite radio operating in the 2332.50-2345 MHz frequency band and the WCS signals are in the 2345-2360 MHz frequency band, and wherein the WCS signals are broadcast by a cellular tower.

20. The filter system according to claim 16 wherein the satellite radio is a Sirius satellite radio operating in the 2320-2332.50 MHz frequency band and the WCS signals are in the 2305-2320 frequency band, and wherein the WCS signals are broadcast by a wireless mobile cellular device.

* * * * *